C. G. CASHMAN.
DETACHABLE TOOTH CUTTER.
APPLICATION FILED APR. 5, 1919.
1,340,474.
Patented May 18, 1920.
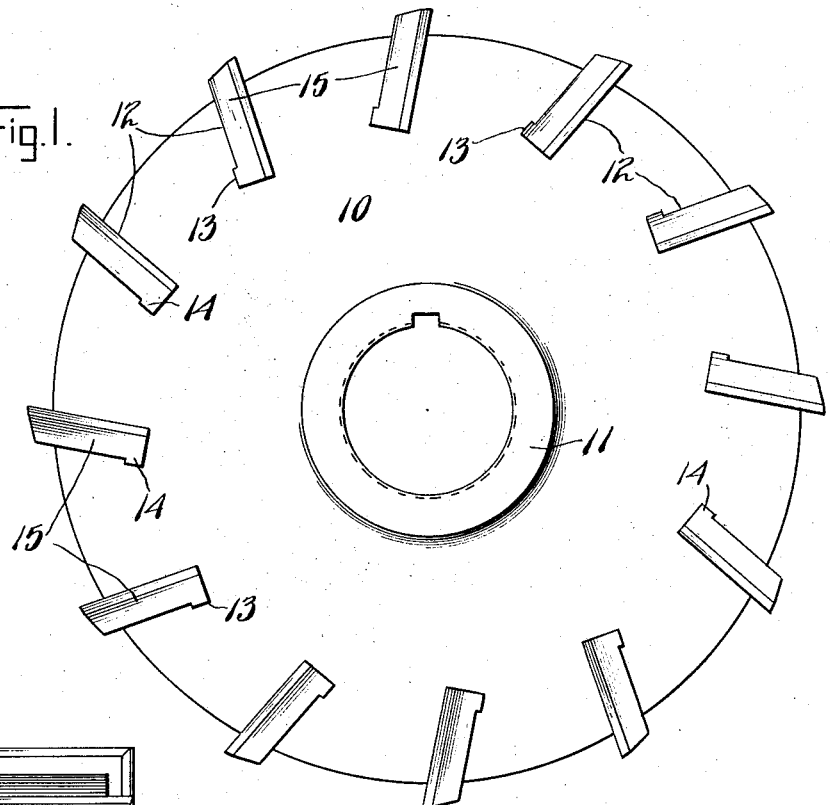
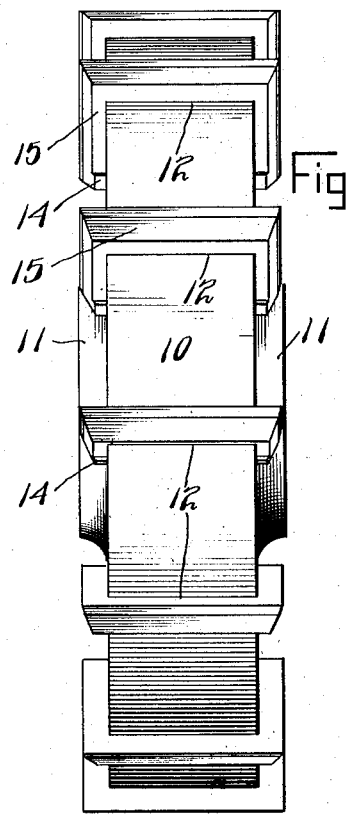
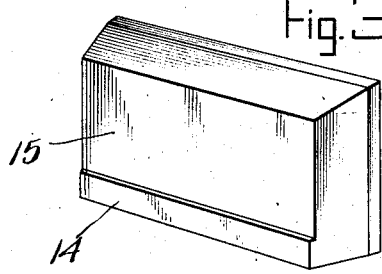
Inventor
Clarence G. Cashman
By Bradford & Doolittle,
Attorneys.

UNITED STATES PATENT OFFICE.

CLARENCE G. CASHMAN, OF WAYNESBORO, PENNSYLVANIA, ASSIGNOR TO CASHMAN TOOL COMPANY, OF WAYNESBORO, PENNSYLVANIA, A CORPORATION OF PENNSYLVANIA.

DETACHABLE-TOOTH CUTTER.

1,340,474. Specification of Letters Patent. Patented May 18, 1920.

Application filed April 5, 1919. Serial No. 287,797.

*To all whom it may concern:*

Be it known that I, CLARENCE G. CASHMAN, a citizen of the United States, residing at Waynesboro, Franklin county, and State of Pennsylvania, have invented and discovered certain new and useful Improvements in Detachable-Tooth Cutters, of which the following is a specification.

My said invention relates to cutters and more particularly to that class in which the cutting elements are not expansible.

The object of the invention is to provide a cutter of a construction which will permit of the easy insertion and withdrawal of the teeth and one in which only the element of friction is employed to retain the said teeth in their proper positions, and at the same time retain them in a rigid and secure manner, all as will be hereinafter more fully described and claimed.

The invention has for its further purpose to provide a cutter employing the fewest possible number of parts, rendering it exceptionally simple in construction.

Referring to the accompanying drawings which are made a part hereof and on which similar reference characters designate corresponding parts, Figure 1 is an end elevation of a cutter constructed in accordance with my invention, Fig. 2, a side elevation thereof, and Fig. 3, a detail perspective of one of the cutter blades.

In the said drawings, the numeral 10 designates a cutter head composed of a relatively heavy disk having formed integrally therewith a hub portion 11 bored to fit any suitable mandrel. The periphery of said disk is provided with a series of slots 12 whose planes are parallel with the axis in one direction and tangential to a circle intermediate the center and periphery. The slots are formed with undercut or off-set grooves at 13 to receive a rib 14 formed integral with and at the back of the teeth or cutters 15 at their inner corners. These cutters are driven longitudinally into the slots 12 and retained therein by friction and the inter-locking rib and groove connection at the base, thereby eliminating the necessity of any other fastening means and reducing the number of parts to a minimum. Owing to the cutters being positioned in parallelism with the axis and at a tangent, the liability of the cutters becoming loosened is eliminated.

Having thus fully described my said invention, what I claim as new and desire to secure by Letters Patent is:

1. A cutting tool comprising a plurality of cutters, each comprising substantially a blade having parallel surfaces, a bead formed along one edge and a cutter head having slots formed in parallelism with its axis of rotation and complementary to the cutter permitting the driving of the cutter into the slots by a movement in parallelism with the axis of rotation.

2. A cutting tool comprising a plurality of cutters having substantially parallel walls, a cutting edge formed along one longitudinal edge of the cutter, a bead formed outstanding from the edge of the cutter opposite the cutting edge, a cutter head having slots in parallelism with the axis of rotation and formed complementary to the cutter permitting the cutter to be driven into the slot by a movement in parallelism with the bead.

3. A cutting tool comprising a plurality of cutters having substantially parallel opposite walls with three edges of the cutter reduced to cutting proportions, a bead formed outstanding from one of the parallel walls along the fourth edge, a cutter head having a plurality of walls formed parallel with the axis of rotation in one direction and tangential to a circle intermediate the periphery and center in opposite direction and with an offset proportioned to receive the bead when the cutter is driven into the slot by movement in parallelism with the axis of rotation.

In witness whereof, I have hereunto set my hand and seal at Waynesboro, Pennsylvania, this 27th day of March, A. D. nineteen hundred and nineteen.

CLARENCE G. CASHMAN. [L. S.]

Witnesses:
H. D. BOCK,
EDITH CASHMAN.